(12) United States Patent
Hernandez et al.

(10) Patent No.: US 6,896,924 B2
(45) Date of Patent: May 24, 2005

(54) TWO-TEXTURE PET FOOD PRODUCT

(76) Inventors: Angel Hernandez, 15011 Calle La Paloma, Chino Hills, CA (US) 91709; Helen Munday, Lodge Farmhouse, Nether Broughton LE14 3EX (GB); Emine Unlu, 1245 S. Oakland Ave., Pasadena, CA (US) 90058; Saeed Ahmed, 13846 Greenstone Ave., Norwalk, CA (US) 90650; Alexandre C. Mendes, 12707 Caswell Ave., Apt. #104, Los Angeles, CA (US) 90066; Stewart Townsend, 17381 Majestic Cypress Way, Yorba Linda, CA (US) 92886; Peter Slusarczyk, 790 Bone Acord St., Fergus ON (CA), N1M 3A5; Christopher Frank, 5328 Bryant Ave., Oakdale, CA (US) 94618

( * ) Notice: Subject to any disclaimer, the term of this patent is extended or adjusted under 35 U.S.C. 154(b) by 230 days.

(21) Appl. No.: 10/244,259

(22) Filed: Sep. 16, 2002

(65) Prior Publication Data

US 2004/0052906 A1 Mar. 18, 2004

(51) Int. Cl.$^7$ .................................................. A23K 1/18
(52) U.S. Cl. ..................... 426/623; 426/635; 426/805; 426/94; 426/282; 426/283
(58) Field of Search ................................ 426/623, 635, 426/805

(56) References Cited

U.S. PATENT DOCUMENTS

| | | | | |
|---|---|---|---|---|
| 3,615,675 A | * | 10/1971 | Wisdom et al. | 426/281 |
| 3,764,715 A | * | 10/1973 | Henthorn et al. | 426/273 |
| 3,882,257 A | * | 5/1975 | Cagle | 426/274 |
| 3,916,029 A | * | 10/1975 | Hildebolt | 426/94 |
| 3,922,353 A | * | 11/1975 | Bernotavicz | 426/94 |
| 4,006,266 A | * | 2/1977 | Bone et al. | 426/623 |
| 4,032,665 A | * | 6/1977 | Miller et al. | 426/104 |
| 4,190,679 A | * | 2/1980 | Coffee et al. | 426/623 |
| 4,260,635 A | | 4/1981 | Fisher | |
| 4,366,175 A | * | 12/1982 | Brown et al. | 426/92 |
| 4,596,714 A | * | 6/1986 | Brabbs | 426/297 |
| 4,689,238 A | * | 8/1987 | Hitchner | 426/571 |
| 4,777,058 A | | 10/1988 | Chandler et al. | |
| 4,857,333 A | * | 8/1989 | Harold | 424/442 |
| 4,888,192 A | * | 12/1989 | Ramnarine | 426/448 |
| 4,900,572 A | * | 2/1990 | Repholz et al. | 426/282 |
| 5,120,554 A | * | 6/1992 | Farnsworth et al. | 426/282 |
| 5,289,795 A | * | 3/1994 | Mohilef | 119/51.01 |
| 5,312,633 A | * | 5/1994 | Schwartz | 426/94 |
| 5,681,605 A | * | 10/1997 | Takemori et al. | 426/549 |
| 5,695,797 A | * | 12/1997 | Geromini et al. | 426/62 |
| 5,750,170 A | * | 5/1998 | Daouse et al. | 426/283 |
| 5,897,893 A | * | 4/1999 | Mohilef | 426/89 |
| 6,001,400 A | * | 12/1999 | Burger | 426/94 |
| 6,117,477 A | * | 9/2000 | Paluch | 426/623 |
| 6,517,877 B2 | * | 2/2003 | Gannon | 426/94 |
| 6,733,263 B2 | * | 5/2004 | Pope et al. | 425/131.1 |
| 2004/0005392 A1 | * | 1/2004 | Filipi et al. | 426/282 |

FOREIGN PATENT DOCUMENTS

| | | | |
|---|---|---|---|
| DE | 3417196 A1 | | 11/1985 |
| EP | 0 071 331 | * | 2/1983 |
| JP | 62-296847 | * | 12/1987 |
| NL | 7507482 | * | 12/1976 |
| WO | WO 99/47000 | * | 9/1999 |

* cited by examiner

*Primary Examiner*—N. Bhat
(74) *Attorney, Agent, or Firm*—Fulbright & Jaworski LLP

(57) ABSTRACT

A nutritionally complete, shelf stable pet food product and process of manufacture includes two different textures which has a meaty outer component and a inner bone-like component.

7 Claims, 4 Drawing Sheets

A

B

C

D

TWO-TEXTURE PET FOOD PRODUCT

TECHNICAL FIELD

The present invention is directed to a nutritionally complete, shelf stable pet food product and process of manufacturing that has two different textures, and more particularly to a pet food product that has a semi-moist meaty outer component and an inner bone-like component.

BACKGROUND OF THE INVENTION

It has long been known that soft, meaty pet foods are very palatable to companion animals and these types of food have many advantages to pet owners. It has also long been known that dry, crunchy pet foods have desirable teeth cleaning and storage characteristics. There are numerous kinds of pet foods that are combinations of these two types of pet foods.

Blends of pet foods having a hard outer component and a soft textured inner component have been extensively produced and have achieved notable success. Examples of such pet foods are described in U.S. Pat. Nos. 3,916,029, 4,777,058 and 6,117,477. Other pet foods having a soft-textured outer component and a hard inner component are described in U.S. Pat. Nos. 4,900,572 and 4,260,635.

It is also known that companion animals typically derive a high level of satisfaction from consuming table scraps that include bones and pet owners frequently give their pets table scraps even though most table scraps are not nutritionally complete foods for companion animals. Additionally, table scraps can spoil quickly and are not capable of being stored without refrigeration.

Thus, it is an object of the present invention to provide a pet food product that provides a high level of eating satisfaction for companion animals that also has a high nutritional and caloric value providing all the constituents of a balanced diet for the animal.

It is a further object of the invention to provide a pet food product having a meaty outer component and an inner bone-like component that is microbiologically stable when stored without refrigeration in non-hermetic packages.

It is yet a further object of the present invention to provide a pet food product having a meaty outer component and an inner bone-like component in a novel shape and form that is appealing to the pet owner, easy to handle and in proper amounts for feeding to an animal.

BRIEF SUMMARY OF THE INVENTION

The present invention is directed to a nutritionally complete, shelf stable pet food product and process of manufacturing.

A preferred embodiment of the present invention is a two textured pet food product that has an inner component and an outer component, which form a unitary, nutritionally complete, shelf stable pet food product. More specifically, the inner component has a moisture content range of about 12% to about 20% and the outer component has a moisture content range of about 10% to about 30%.

A further embodiment of the present invention is a two textured pet food product manufactured by a process selected from the group consisting of injection molding, extrusion-clamshell, clam shell-clam shell molding and extrusion.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
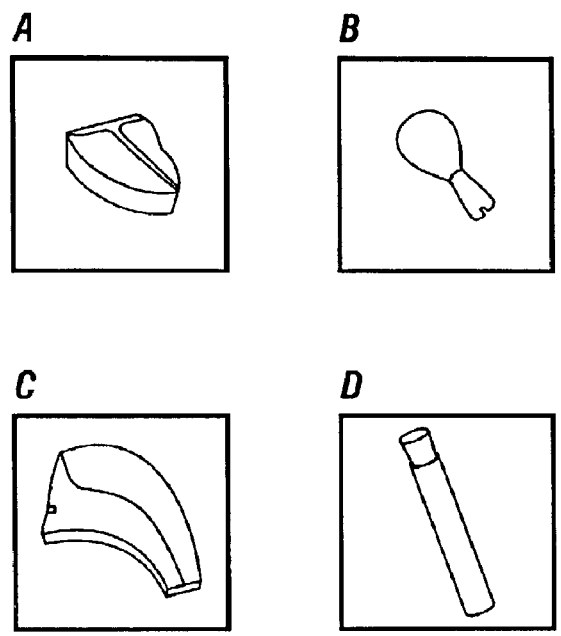
FIG. 1A–FIG. 1D illustrates various shapes of the inventive two texture pet food product.

The present invention is directed to a nutritionally complete, shelf stable pet food product and process of manufacturing. The inventive pet food product includes a semi-moist and/or dry outer meaty component and semi-moist and/or dry inner bone-like component that can be formed to resemble any various meaty bone shapes which are typically consumed by animals, for example, but not limited to beef T-bone (FIG. 1A), a pork chop (FIG. 1C), a chicken or turkey drumstick (FIG. 1B and FIG. 2) or beef or pork ribs (FIG. 1D).

It is envisioned that the inventive nutritionally complete two texture pet food is a product that induces and/or entices an instinctive behavior in a companion animal, which includes, but is not limited to dogs, cats or horses. Typically, companion animals are fed dried kibble that resembles cereal, which would not invoke an instinctive behavior. The present invention is in the form of a meaty bone shape. Thus, it is contemplated that the meaty bone shape entices the instinctive behavior in the animal while providing a complete nutritional meal for the animal. Yet further, it is also envisioned that enticing the instinctive behavior of the animal increases the animal's desire to eat while increasing the animal's satisfaction by involving it's instinctive behavior.

Figure 2:
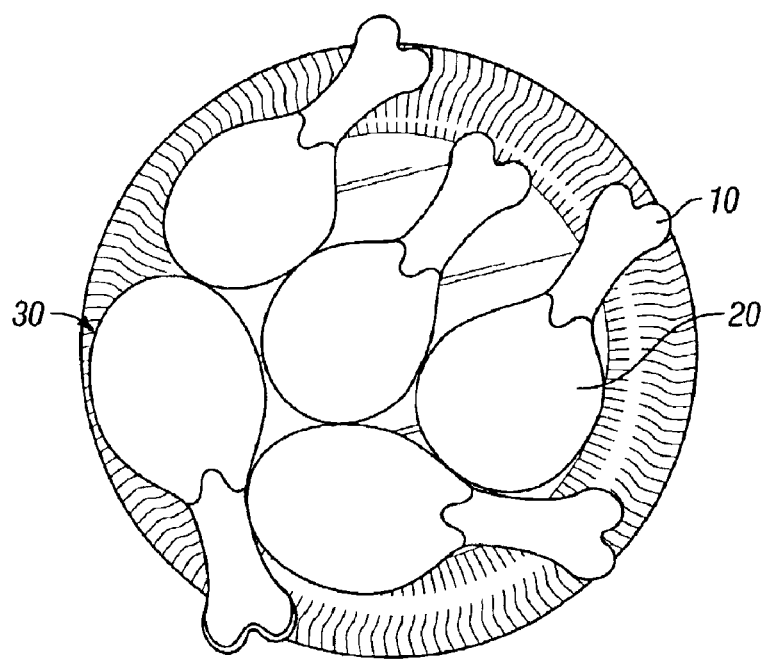
FIG. 2 illustrates the inventive pet food product in the shape of a drumstick.
Figure 3:
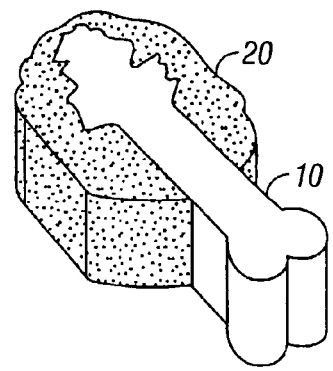
FIG. 3 illustrates yet another shape of the inventive pet food product.

FIG. 2 and FIG. 3 illustrate a two texture pet food in the shape of a either a chicken or turkey drumstick (30). More specifically, FIG. 3 is another shape of the two texture pet food in which the shape is a drumstick shape having an inner bone-like component (10) and an outer meaty component (20). Preferably, the outer meaty component is wrapped around the inner bone-like component either completely or partially.

The inner bone-like component (10) is generally formed from dry and liquid ingredients. The dry ingredients can include flours such as corn, wheat, rice, barley, oat, legumes etc., individual meals such as bone, chicken, beef, or poultry or combinations thereof, vitamins, minerals, sugars, hydrocolloids and colorant. The liquid ingredients can include water, fats, oils, glycerol, antioxidants, emulsifiers, liquid sugar, etc. The combination of ingredients that are used for the inner bone-like component produce a component that has a dry, crumbly and granular texture.

The outer meaty component (20) is generally formed from a meat mixture of different meats such as chicken, beef, pork, lamb or combinations thereof and dry ingredients including flours and/or starches such as wheat, barley, corn, rice, and oats, corn, wheat, rice, potato, and tapioca, gums, colors, and vitamins and minerals. Since the outer component is meaty and formed from predominantly, but not limited to meat based ingredients, the texture of the outer meaty component can be fibrous and linear.

In preferred embodiments, the inner bone-like component is a semi-moist food product and as such, any semi-moist pet food formulation known to one of skill in the art can be used. For example, the subject inner bone-like component may have a moisture content in the range of about 12% to about 20%. The inner bone-like component also includes, on a dry matter basis, at least about 17% by weight of protein, about 2% to about 10% by weight of fat and at least about 60% by weight carbohydrate. It is also preferable that the inner bone-like component has a water activity, $A_w$, of at least about 0.8 or greater, and more preferably, in the range of about 0.8 to about 0.83.

Yet further, in preferred embodiments, the outer meaty component is a semi-moist food product and as such, any semi-moist pet food formulation known to one of skill in the art can be used. For example, the subject outer meaty component may have a moisture content in the range of about 10% to about 30%. The outer component also includes on a dry matter basis, about 10% to about 20% by weight of protein, about 2% to about 10% by weight of fat and about 40% to about 78% by weight carbohydrate. It is also preferable that the outer meaty component has a water activity, $A_w$, of at least about 0.8 or greater, and more preferably, in the range of about 0.9 to about 1.0.

More preferably, the final two texture product has a moisture content of about 20% to about 25%, about 16% to about 18%, by weight protein; about 4% to about 5% by weight fat and about 48% to about 60% by weight carbohydrate. Yet further, it is preferable that the final product have about 40% to about 60% inner bone-like component to about 60% to about 40% outer meaty component.

In further aspects, the two texture product of the present invention may have a variety of sizes, for example, small, medium and large.

The two texture pet food product can be manufactured by processes such as injection molding, extrusion-clamshell molding, or various extrusion processes. Thus, one of skill in the art realizes that the ingredients described above can be used to in any of the described processes contained herein to manufacture the product of the present invention. Yet further, it is also within the purview of a skilled artisan to alter the ingredients of the inner and/or outer component to further enhance such as the texture or taste, increase the ease of production, or increase the shelf stability of the inner and/or outer component.

Figure 4:
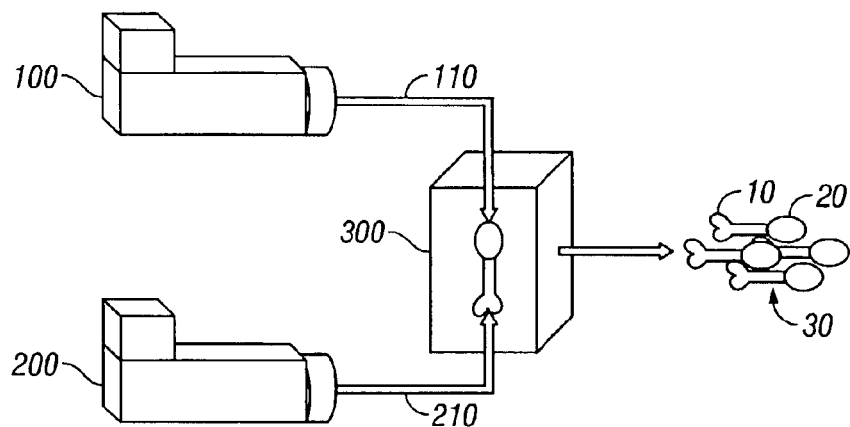
FIG. 4 illustrates an injection molding process that is used to manufacture the inventive pet food product.

One of the processes for forming the two textured pet food product (30) is an injection molding process, as illustrated in FIG. 4, in which the two different textures are created by the injection of the two components into the same mold. The mold can be in the shape of a chicken drumstick or any other desired shape. The ingredients for each of the components (ingredients are described above and are incorporated herein) are fed into different extruders (100, 200) where the ingredients are mixed to form moldable masses. Each component is injected (110, 210) into the mold (300) in which the mixture for the inner component is injected into the center portion of the mold and the outer component surrounds a portion of the inner component. The mold can be either heated and/or cooled to set the texture of product for possible down-stream processing, which includes, but is not limited to retorting, baking or irradiating.

Figure 5:
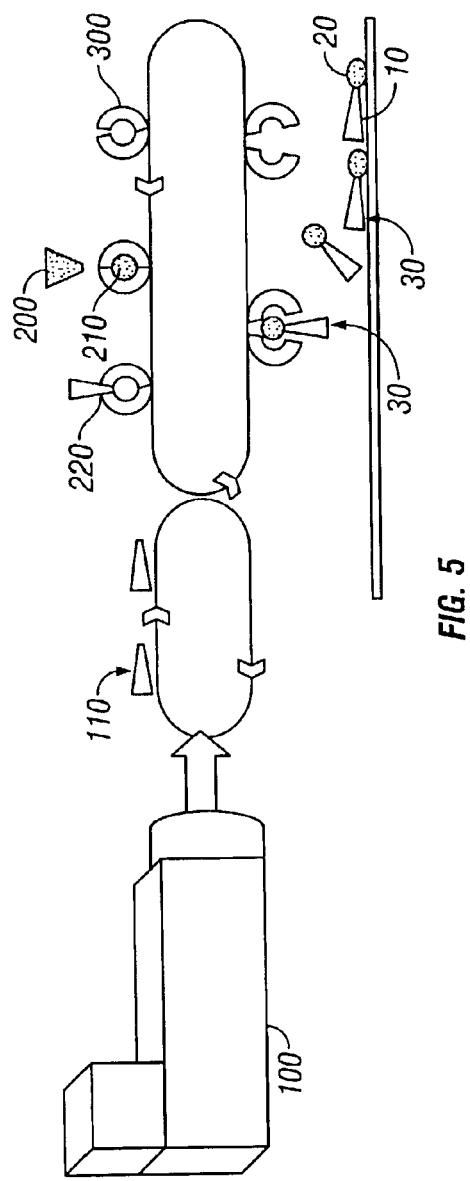
FIG. 5 illustrates an extrusion-clam shell molding process that is used to manufacture the inventive pet food product.

Another process for forming the two textured pet food product is directed to a two step process consisting of an extrusion step and a clam-shell molding step, as shown in FIG. 5. The inner component is formed by the extrusion step and the outer component is formed by the clam-shell molding step. In this process, the ingredients for the inner bone-like component, which are described above, are fed into an extruder (single screw or twin-screw) (100) via a feeding system known to one skilled in the art. The mixture inside the extruder is heated to ensure proper gelatinization of the starches and protein denaturation and the mixture is forced through a die configured for a particular bone-like shape (110), such as a bone knuckle. The inner bone-like components are then cut by different processes which may include, but are not limited to Ultrasonics, Water Jets, or conventional knives. Then, the inner bone-like components are then cooled down to room temperature and conveyed to the second step of the process where they are inserted into the outer component.

The second step of the process consists of clamshell molding in which the molds (300) can be configured to form various meat on bone shapes such as chicken/turkey drumstick, beef T-bone, beef/pork rib or pork-chop. Preferably, the molds are made of stainless steel with Teflon® or a similar coating inside to ensure a smooth textured product as well as providing for easy release of the formed product. In addition to permanent coating, these molds can be coated with an edible film to function as a barrier or to give skin appearance. A series of molds can be installed on a chain conveyor to enable continuous processing. The meat mixture consisting of different meats (chicken, beef, pork, lamb or combinations) and powders (flours of wheat, barley, corn, rice, oat, starches of corn, wheat, rice, potato, tapioca, gums, colors, vitamins and minerals) is deposited into the molds via a pumping system (200) at the specified quantity. Upon deposition of the meat mixture (210), the inner bone-like component from the extruder line is fitted into the meat phase (220). Following this step, the molds are either heated or cooled to set a firm product texture so that meaty drum sections will not be deformed after being released from the molds. The bones with their meaty drums (30) are then released from the molds and conveyed to subsequent processing lines including, but not limited to baking, retorting or irradiating. For retorting, the product is packed into their primary thermo-stable packages. For the baking option, the product is packed following baking and subsequent cooling.

Figure 6:
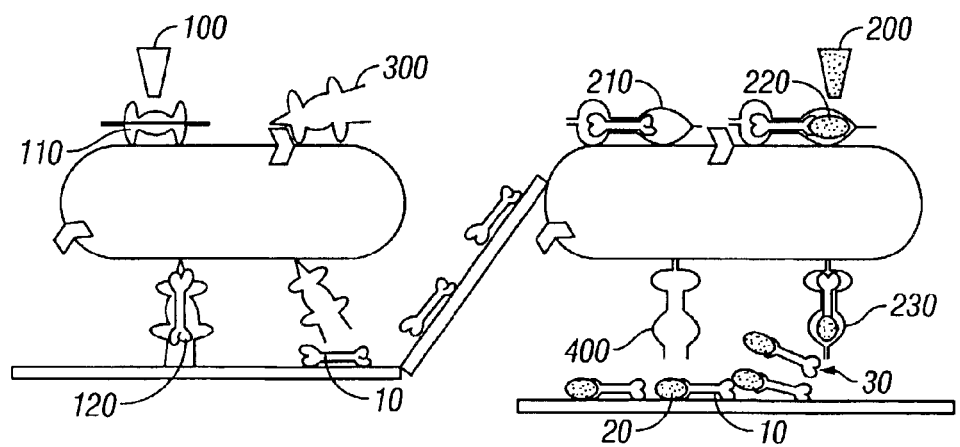
FIG. 6 illustrates a clam shell-clam shell molding process that is used to manufacture the inventive pet food product.

FIG. 6 illustrates another process for forming the inventive two texture pet food product. This process is a variant of the above process in that it involves clam shell-clam shell molding. In this process, the molds (300) can be configured to form various meat on bone shapes such as chicken/turkey drumstick, beef T-bone, beef/pork rib or pork-chop. A series of molds can be installed on a chain conveyor to enable continuous processing. First, the inner component as described above is mixed and is deposited into the molds via a pumping system (100) at the specified quantity. Upon deposition of the inner bone-like mixture (110), the heated molds are used to set a firm product texture (120). After the inner bone-like component is formed and released from its mold, the inner component (210) is fitted into the meat phase (220), which is deposited into the molds via a pumping system (200) at the specified quantity. Following this step, the molds can be either heated or cooled to set a firm product texture (230) so that meaty drum sections will not be deformed after being released from the molds. The inner bone-like components with their meaty outer components (30) are then released from the molds and conveyed to subsequent processing lines including, but not limited to baking, retorting or irradiating. For retorting, the two texture products are packed into their primary thermo-stable packages. For the baking option on the other hand, the two texture products are packed following baking and subsequent cooling.

Figure 7:
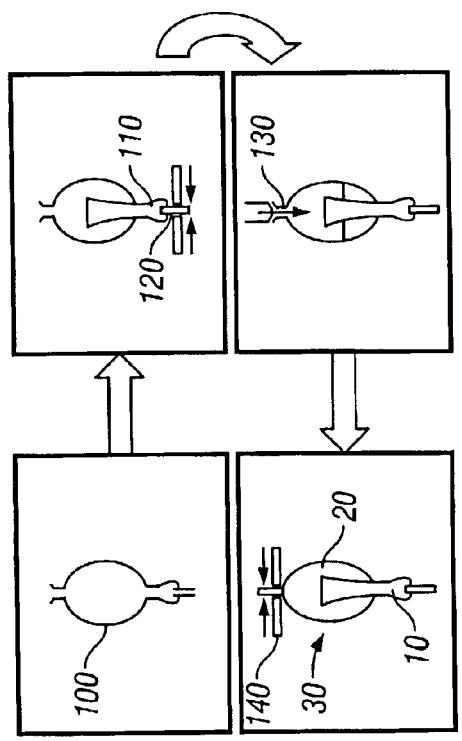
FIG. 7 illustrates an alternative molding process by which the product is injected into a package, which is also the mold.

An additional process for forming the two texture pet food product involves injection molding combined with vacuum forming-low pressure depositing, as illustrated in FIG. 7. In this process, a thermally stable clear plastic package is molded into the final shape of the product (100), such as a drumstick, by vacuum forming. The inner bone-like component, which is previously made by any of the described methods disclosed herein, is fitted into the knuckle portion of the package mold (110) and the lower portion of the package is sealed following the insertion of inner bone-like component (120). After sealing the lower portion of the package, a piston depositor using low pressure deposition injects the meaty component (130) into the package mold. The injected meaty component surrounds the inner bone-like component to form the meaty outer component. Once the meaty outer component is pumped into the package, the package is sealed (140) and can be either heated and/or cooled to set the texture of the product. The product can also undergo further down-stream processing, for example, but not limited to retorting, baking or irradiating.

Figure 8:
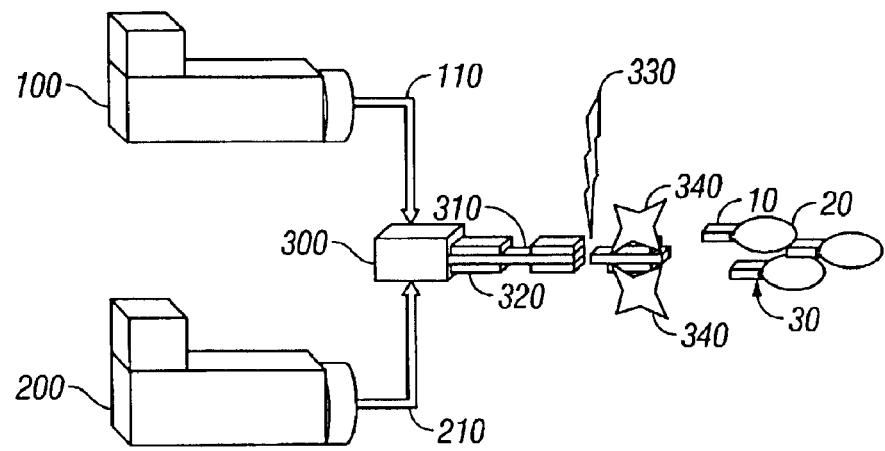
FIG. 8 illustrates an alternative extrusion process that is used to manufacture the inventive pet food product.

FIG. 8 illustrates another alternative to an extrusion process that is used to manufacture the present invention. This process involves two extruders (twin or single). One extruder (200) produces the inner bone-like component with the second extruder (100) producing the outer meaty component. Flow streams (110, 210) coming from each extruder are converged into a common die (300) with three specially designed openings. The opening for the inner bone-like component is located at the center while the other two openings for the outer meaty component are located at the bottom and the top of the die. During operation, the outer meaty component is extruded from the top and the bottom openings (320) to cover the inner bone-like component that is extruded from the center opening (310). In order to aid the formation of shape of the product (i.e., drumstick), the outer meaty component that is extruded exits the die intermittently via the appropriate screw profile or timing mechanism. This discontinuity in the outer meaty component can also be achieved by diverting the flow to different directions or openings. The product out of the die is cut (330) and conveyed to a forming mechanism that is equipped with two forming wheels (340) situated at the bottom and top of the incoming product flow. Both forming wheels shape the outer meaty component into a drum and wrap around the inner bone-like component. These formed two texture products can then be transferred to further processing including, but not limited to baking, retorting or irradiating.

Figure 9:
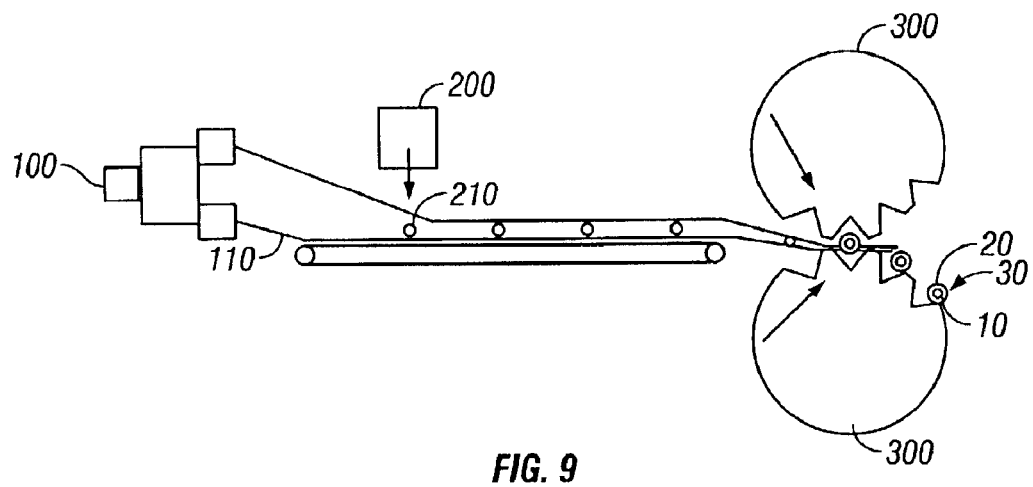
FIG. 9 illustrates another extrusion process that is used to manufacture the inventive pet food product.

Yet further, another process, as illustrated in FIG. 9, is a variation of the above process involving two extruders (twin or single). One extruder (200) produces the inner bone-like component with the second extruder (100) producing the outer meaty component. The outer meaty component is extruded in two flat overlapping layers (110) with a gap in between by extruder (100) using a split flow nozzle. The inner bone-like component (210) is extruded by extruder (200), hot cut to the desired length, and deposited at a 90° angle to the flow of outer component by use of an inserting device, timed by alignment of molding wheels. The top layer of the outer component is applied; sandwiching the inner bone-like component in between two layers of continuously extruded outer meaty component. The final product is shaped and cut out by two molding wheels (300). These formed two texture products (30) can then be transferred to further processing including baking, retorting or irradiating. This process could also be conducted on a single extruder, using a pumping system for the meaty outer component.

Another process is based on two extruders operating at well-controlled throughput, reaching the special die plate in order to form the two texture pet food product of the present invention The dry ingredients, as described above, are mixed in a high-shear mixer to create a uniform feed material for extrusion. In the pre-conditioner and barrel, water, steam, and other minor ingredients can be added. Addition of water and steam in the pre-conditioner starts the initial gelatinization process before the meal mixture is fed into the extruder. Along the extruder barrel, the food material receives a large amount of mechanical energy. The material flows due to pressure and drag flow. The same process is conducted in a parallel extruder, which can be the same or a different model, and with different running conditions. While one extruder can be stationary, the other one can be on wheels to allow the portable extruder to rotate and placed at an angle to the other one (preferably at 45°). The two flows from each extruder are converged together in a special die plate, where the inner bone-like component is surrounded by the outer meaty component. In order to ensure smooth product texture, the die can be made of Teflon®. The die shape can vary from chicken drumstick to beef T-bone, pork chop or beef rib. Both the inner bone-like component and the outer meaty component may have different colors, textures, sizes and structures. Upon exiting the extruder, the product is cut and conveyed to an additional processing line that may include baking or retorting.

Still further, another process that can be used to produce a pet food product having two textures is to produce a two dimensional inner bone-like component using standard extrusion techniques, which is puffed to produce a three dimensional component. The three dimensional inner component is then coated or dipped with the outer meaty component to create two texture appearance and sensation. Prior to processing, the ingredients are mixed well to create a uniform feed material, which is fed into the extruder where all the dry and liquid ingredients are mixed in the presence of heat and shear. In order to achieve a three dimensional product, the extruder die plays a major role, not only for shaping the product, but also causing pressure build-up behind the die. Die shape/size and process conditions should be adjusted to ensure the target product density and texture. Products exiting the extruder die should not be expanded. An expansion control system can be installed along the extruder barrel, or at the die exit to ensure such requirement. After exiting the extruder die, the products are cut and sent to a drier where drying temperature and humidity conditions are closely monitored. This stage is very critical to achieve the right moisture content for the optimum expansion at the end. After the drying, products may be puffed by several means, for example, but not limited to hot oil frying, microwaving and hot air puffing. The three dimensional puffed product in a bone shape or any other desired shape is coated with the outer meaty component to result in the two texture product of the present invention. The outer meaty component can be also applied immediately prior to the puffing stage resulting in different texture. This process can also be conducted with a cold coating/injection of the meaty outer component, to which is then applied further heat to develop the product texture.

An additional process for forming the two textured pet food product involves the separate manufacture of the inner bone-like component followed by enrobing, either by a dipping or spraying method that is well known and used in the art, with the meaty outer component material. The inner bone-like component is achieved by mixing of a dough, followed by molding either by a cookie sheeting process and rotary forming the desired shape, or directly depositing the dough material into a cookie mold. Following a drying process, the inner bone-like component is then enrobed with the meat based material of the outer component and further processed to set the outer meaty component.

A further aspect of the present invention, is to provide a two texture pet food that is microbiologically stable when stored without refrigeration in non-hermetic packages. The compositions of the present invention are such that they provide an antimicrobial environment.

For example, it is well known by those of skill in the art that a water activity of below 0.85 is sufficient to prevent the growth of most pathogenic microorganisms (with the exception of yeasts and molds) in a product. Accordingly, for the purposes of the present invention, the water activity for the inner component is about 0.8 to about 0.83. Since the water activity for the outer component could initially be higher than 0.83, antimicrobial agents and/or humectants that are well known and used by those of skill in the art are added to the outer component to provide antimicrobial activity. Exemplary humectants that can be used in the present invention include, but are not limited to propylene glycol, glycerol, sugar, sorbitol and salt. Antimicrobial agents that can also be used in the present invention include, but are not limited to potassium sorbate, propionic acid and its salts thereof, sodium benzoate, nitrites and nitrates such as those formed with sodium and potassium. It is within the purview of a skilled artisan to use any known humectant or antimicrobial agent or a combination thereof to manufacture a shelf stable product. Yet further, the product of the present invention can also be further processed using standard processing techniques known in the art to provide a shelf stable product. Such processes include, but are not limited to retorting, baking, irradiating, etc.

Yet further, the final product can be packaged using any standard packing techniques and films known to those of skill in the art. For example, such packages include, but are not limited to a retortable pouch, non-retortable pouch, plastic tray, cans or paperboard. The pouch may or may not be resealable. It is envisioned that depending upon the product, a single product itself can have a package or several products are packaged together. Pasteurization processes may also be applicable depending on the shelf life requirements and contribution of other factors.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A two textured pet food product comprising:
   an inner bone-like component having a moisture content range of about 12 to about 20% and having a dry crumbly texture;
   an outer meaty component having a moisture content range of about 10 to about 30% and a water activity of about 0.8 to 1.0;
   wherein the inner component and outer component form a unitary, nutritionally complete, shelf stable pet food product.

2. The product of claim 1, wherein the moisture content of the inner component is about 18%.

3. The product of claim 1, wherein the moisture content of the outer component is about 26% to about 28%.

4. The product of claim 1, wherein the inner component has a water activity of about 0.8 to about 1.0.

5. The product of claim 1, wherein the outer component further comprises about 10% to about 20% by weight protein, about 2% to about 10% by weight of fat and about 40% to about 78% by weight carbohydrate.

6. The product of claim 1, wherein the product has a shape of a beef T-bone, pork chop, chicken drumstick, turkey drumstick, beef rib or pork rib.

7. A two textured pet food product comprising an inner bone-like component having a moisture content range of about 12 to about 20% and having a dry crumbly texture and an outer meaty component having a moisture content range of about 10 to 30% and a water activity of about 0.8 to 1.0, wherein the two textured pet food product is produced by a process selected from the group consisting of injection molding, extrusion-clamshell, clam shell-clam shell molding and extrusion.

* * * * *